US008601093B2

(12) United States Patent
Hellerman et al.

(10) Patent No.: US 8,601,093 B2
(45) Date of Patent: Dec. 3, 2013

(54) METHOD AND SYSTEM FOR GENERATION, ADJUSTMENT AND UTILIZATION OF WEB PAGES SELECTION RULES

(75) Inventors: Gilad Hellerman, Tel-Aviv (IL); Boris Levin, Rishon-LeZion (IL); Tsafrir Peles, Tel-Aviv (IL); Daniel Reuven Scalosub, RaAnana (IL)

(73) Assignee: DSNR Media Group Ltd., RaAnana (IL)

( * ) Notice: Subject to any disclaimer, the term of this patent is extended or adjusted under 35 U.S.C. 154(b) by 181 days.

(21) Appl. No.: 12/981,587

(22) Filed: Dec. 30, 2010

(65) Prior Publication Data
US 2011/0196821 A1    Aug. 11, 2011

Related U.S. Application Data

(63) Continuation-in-part of application No. 12/703,259, filed on Feb. 10, 2010.

(51) Int. Cl.
*G06F 15/16* (2006.01)
(52) U.S. Cl.
USPC ............ 709/217; 709/203; 709/224; 709/226
(58) Field of Classification Search
USPC ......... 709/203, 217, 219, 223, 224, 226, 228, 709/229
See application file for complete search history.

(56) References Cited

U.S. PATENT DOCUMENTS

| | | | |
|---|---|---|---|
| 6,662,215 B1 | 12/2003 | Moskowitz et al. | |
| 2003/0093792 A1* | 5/2003 | Labeeb et al. | 725/46 |
| 2007/0038755 A1 | 2/2007 | Sullivan et al. | |
| 2007/0067215 A1* | 3/2007 | Agarwal et al. | 705/14 |
| 2007/0244748 A1 | 10/2007 | Smith et al. | |
| 2007/0260696 A1* | 11/2007 | Bohannon et al. | 709/208 |
| 2008/0059571 A1* | 3/2008 | Khoo | 709/203 |
| 2008/0162699 A1* | 7/2008 | Gaffney | 709/226 |
| 2008/0201413 A1* | 8/2008 | Sullivan et al. | 709/203 |
| 2008/0243797 A1 | 10/2008 | Song et al. | |
| 2010/0153544 A1* | 6/2010 | Krassner et al. | 709/224 |
| 2010/0191624 A1* | 7/2010 | Sharir et al. | 705/30 |
| 2011/0196690 A1 | 8/2011 | Peles et al. | |

OTHER PUBLICATIONS

Official Action Dated Nov. 8, 2011 From the US Patent and Trademark Office Re. U.S. Appl. No. 12/703,259.
Official Action Dated Jun. 20, 2012 From the US Patent and Trademark Office Re. U.S. Appl. No. 12/703,259.

\* cited by examiner

*Primary Examiner* — Barbara Burgess (57) ABSTRACT

According to some embodiments of the present invention there is provided a system of rule generation for web pages selection mechanism comprising a pattern recognition unit which analyzes a plurality of network requests and identifies a plurality of repeated patterns of characterizing features therein, a calculation unit which computes, for each said repeated pattern, a plurality of statistic features, and a rule construction unit which generates a plurality of web pages selection rules for at least some of said repeated patterns, wherein each of the web pages selection rules comprises a rule condition defining at least one criterion for matching it with characterizing features associated with at least one additional network request and a target web pages selection distribution set according to respective statistic features.

40 Claims, 3 Drawing Sheets

| Landing Page $LP_i$ | Number of Hits $n_i^{(p)}$ | Number of Conversions $m_i^{(p)}$ | Conversion Rate $C_i^{(p)} = m_i^{(p)}/n_i^{(p)}$ |
|---|---|---|---|
| $LP_1$ | $n_1^{(p)}$ | $m_1^{(p)}$ | $C_1^{(p)}$ |
| $LP_2$ | $n_2^{(p)}$ | $m_2^{(p)}$ | $C_2^{(p)}$ |
| ... | ... | ... | ... |
| $LP_K$ | $n_K^{(p)}$ | $m_K^{(p)}$ | $C_K^{(p)}$ |
| $\sum_i$ | $N^{(p)}$ | $M^{(p)}$ | |

| $RC^{(p)}$ | $DD^{(p)}$ | $N^{(p)}$ | $M^{(p)}$ | $C^{(p)}$ | $`N^{(p)}$ | $`M^{(p)}$ | $`C^{(p)}$ | $E^{(p)}$ | $\widetilde{E}^{(p)}$ |

METHOD AND SYSTEM FOR GENERATION, ADJUSTMENT AND UTILIZATION OF WEB PAGES SELECTION RULES

RELATED APPLICATIONS

This application is a continuation-in-part (CIP) of U.S. patent application Ser. No. 12/703,259 filed Feb. 10, 2010, the contents of which are incorporated herein by reference in their entirety.

FIELD AND BACKGROUND OF THE INVENTION

The present invention, in some embodiments thereof, relates to the generation and adjustment of rules used in the selection of web pages presented to users, for example, landing pages in advertising campaigns.

In online marketing a landing page, sometimes known as a lead capture page, appears when a potential customer clicks on an advertisement or a search-engine result link or otherwise impressions promotional content. The landing page usually display content that is a logical extension of the advertisement or link or promotional content (e.g., banner), and that is optimized to feature specific keywords or phrases for indexing by search engines.

During the last years various mechanisms for optimizing the selected landing pages have been developed. U.S. Pat. No. 6,662,215 describes a communication method for communication between a user computing device and a first server arrangement wherein a communication including data representing a characteristic of the user computing device is transmitted from the first server arrangement to a second server arrangement wherein a population segment is selected and a content is determined in accordance with the user characteristic, thereafter a first response including data representing the determined content is transmitted from the second server arrangement to the first server arrangement, and a second response including at least the determined content is then transmitted from the first server arrangement to the user computing device. The content corresponds to a plurality of concept elements.

Another example is described in U.S. Patent Application Publication No. US 2008/0243797, filed on Mar. 28, 2008 which describes method and system for displaying a keyword advertisement through retrieval of an optimal landing page associated with a detailed keyword, and displaying the retrieved landing page for a user instead of displaying a non-specific landing page associated with the advertisement keyword included in the detailed keyword. A method of displaying a keyword advertisement is disclosed wherein a detailed keyword including one or more advertisement keywords purchased by an advertiser and character strings is received from a user, in accordance to which a landing page is dynamically retrieved and displayed to the user.

In U.S. patent application Ser. No. 12/703,259, filed on Feb. 10, 2010, the entire content of which is incorporated herein by reference, there is described a method and system of selecting landing pages and optimizing routing efficiency wherein impression data obtained from a request for a promotional content from a user is employed in selecting a landing page from a plurality of landing pages. In this application the landing page selection is carried out by means of routing efficiency parameters related to plurality of routing scenarios in each of which a landing page is being routed to a user responsive to an optional impression scenario.

SUMMARY OF THE INVENTION

According to some embodiments of the present invention there is provided a rule generator which generates web pages selection rules for a web pages selection mechanism, wherein each web pages selection rule comprises a rule condition and a target web pages selection distribution. The rule generator comprises a pattern recognition unit which analyzes a plurality of network requests and identifies a plurality of repeated patterns of characterizing features in them, a calculation unit which computes for each repeated pattern a plurality of statistic features, and a rule constructing unit which defines a plurality of web pages selection rules for at least some of the plurality of repeated patterns.

The rule condition of the web pages selection rules may define at least one criterion for matching it with characterizing features associated with at least one additional network request. Optionally, the at least one criterion is based on one of the plurality of repeated patterns.

The target web pages selection distribution may be set according to respective statistic features computed for the rule. Optionally, the target web pages selection distribution of each of the plurality of web pages selection rules defines for each of the plurality of web pages a percentage of the plurality of network requests for which it be selected.

Each network request may be associated with a plurality of indications comprising, a selected web page indication specifying a web page that been selected responsive to each network request, and a desired user action indication specifying occurrence of a desired user action responsive to provision of the web page.

The plurality of statistic features may comprise a plurality of probabilities, each being a probability of a rate of occurrence of desired user actions responsive to selection of a specific web page. Additionally or alternatively, the statistic features may comprise a plurality of predicted rates of occurrence of desired user actions computed for the plurality of web pages selection rules. Optionally, the rule constructing unit sorts the plurality of web pages selection rules according to their predicted rate of occurrence of desired user actions.

The rule constructing unit may validate the web pages selection rules based on a predetermined rule approval policy, and it may remove non-valid web pages selection rules. Optionally, the rule constructing unit removes a new web pages selection rule which rule condition includes or covers a rule condition of another web pages selection rule, if the predicted rate of occurrence of desired user actions of the new web pages selection rule is smaller than a rule maintenance threshold.

According to some embodiments of the present invention there is provided a web pages selection system. The web pages selection system comprises a rule generator as described hereinabove and hereinbelow, and a redirection unit which receives the at least one additional network request, identifies a plurality of characterizing features associated with it, matches the identified plurality of characterizing features with at least one of the plurality of web pages selection rules, selects a web page from a plurality of web pages based on target web pages selection distributions of the matched at least one of the plurality of web pages selection rules, and redirects a user terminal from which the at least one additional network request been received to the selected web page.

The web pages selection system may further comprise a network interface which receives the plurality of network requests from a plurality of user terminals over a computer network.

A database may be further provided which hosts the plurality of web pages selection rules and a plurality of data records, wherein each data record comprises the plurality of characterizing features identified for each network request and a respective plurality of indications associated therewith. Optionally, the redirection unit is adapted to update the database with the plurality of characterizing features of the additional network request and with its plurality of indications.

Optionally, the plurality of web pages comprises campaign landing web pages.

The calculation unit may routinely or periodically compute for the web pages selection rules a plurality of effectiveness evaluations reflecting the increase in desired user actions occurred since the web pages selection rules are being used. The rule generator may be adapted to issue alerts whenever one of the plurality of effectiveness evaluations is of negative value.

The plurality of effectiveness evaluations may comprise a plurality of predicted effectiveness evaluations reflecting the expected increase in desired user actions. Optionally, the rule constructing unit approves web pages selection rules which effectiveness evaluation is greater than the average of their previously computed effectiveness evaluation and predicted effectiveness evaluation.

According to some embodiments of the present invention there is provided a web page selection unit for directing a user terminal to a web page selected from a plurality of web pages. The web page selection unit comprises: a feature identifier unit which receives a network request sent from the user terminal and identifies a plurality of characterizing features associated with it; a rule matcher unit which matches the network request with at least one web pages selection rule from a plurality of web pages selection rules, wherein each web pages selection rule comprises a rule condition defining at least one criterion for matching it with plurality of characterizing features associated with network requests, and a desired web pages selection distribution; and a distributor unit which selects a web page from the plurality of web pages based on target web pages selection distributions of the at least one web pages selection rule, and redirects the user terminal to the selected web page.

According to some other embodiments of the present invention there is provided a method of rule generation and adjustment for a web page selection mechanism. The method comprises monitoring a plurality of network requests received from a plurality of user terminals, identifying a plurality of characterizing features in each of the received network requests, analyzing the plurality of network requests to identify a plurality of repeated patterns of characterizing features, computing a plurality of statistic features for each identified repeated pattern, and generating a plurality of web pages selection rules for at least some of the plurality of repeated patterns, wherein each of the web pages selection rules comprises a rule condition defining at least one criterion for matching it with plurality of characterizing features of at least one additional network request and a target web pages selection distribution set according to respective statistic features of the web pages selection rule.

The method may further comprise recording in a database for each network request the plurality of characterizing features and a plurality of indications associated with it, the plurality of indications comprising a selected web page indication specifying a web page that been selected responsive to the plurality of characterizing features, and a desired user action indication specifying occurrence of a desired user action responsive to provision of the web page.

A web pages selection rule may be generated for each of the at least some of the plurality of repeated patterns whenever a total number of desired user action indications complying with one of the repeated patterns is greater than a predetermined rule creation threshold. Optionally, the predetermined rule creation threshold is in the range obtained by multiplying the number of landing pages by a predetermined parameter. More optionally, the value of the predetermined parameter is selected based on the campaign rate.

The statistic features may comprise a plurality of probabilities computed by raising rates of desired user actions related to the repeated pattern to a power of a rule reliability factor. Optionally, the rule reliability factor is computed for each web pages selection rule based on an average number of desired user action indications. More optionally, the rule reliability factor is set by a piecewise linear function of the average number of desired user action indications.

The statistic features may comprise a plurality of instances of the plurality of probabilities, each instance of plurality of probabilities is based on plurality of indications associated with network requests received within a time window selected from a plurality of time windows, wherein the target web pages selection distribution is based on a weighted average of the instances of plurality of probabilities. Optionally, a plurality of predicted rates of occurrence of desired user actions are used as the weights in the weighted average, wherein each predicted rate of occurrence of desired user actions is based on plurality of indications associated with network requests received within one of the time windows.

Optionally, the plurality of time windows comprises two predetermined time windows, a first time window defined to include all network requests received, and a second time window defined to include network requests received within a predetermined recent time window. The predetermined recent time window may be determined as a function of the number of web pages.

The method may further comprise sorting the web pages selection rules in a descending order according to a plurality of predicted rates of occurrence of desired user actions computed for each web pages selection rule of predicted rates.

Optionally, a new target web pages selection distribution, and a new predicted rate of occurrence of desired user actions, are computed for each of the plurality of web pages selection rules whenever a new web page is added.

More optionally, the web pages selection rules are generated whenever the total number of desired user action indications is greater than a predefined number.

A new set of web pages selection rules may be generated whenever a new web page is added and the number of the desired user action indications accumulated since the new web page was added is greater than a preset value. Optionally, the preset value is set to equal, or ranges about, a rule creation threshold.

The method may further comprise receiving at least one additional network request, identifying a plurality of characterizing features associated with the additional network request, determining at least one of the plurality of web pages selection rules which rule condition matches the identified plurality of characterizing features, selecting a web page based on target web pages selection distributions of the determined at least one of the plurality of web pages selection rules, and directing a user terminal from which the additional network request originated to access the selected web page.

The method may further comprise determining at least one partially matching web pages selection rule and selecting a web page based on target web pages selection distributions of the at least one partially matching web pages selection rule, if no matching web pages selection rules are determined.

The method may also comprise selecting a default web pages selection rule, and selecting a web page based on target web pages selection distribution of the default web pages selection rule, if no partially matching web pages selection rules are determined.

Optionally, whenever more than one web pages selection rules are determined, an interim target web pages selection distribution is computed based on target web pages selection distributions of the more than one web pages selection rules. The interim target web pages selection distribution may be computed as a weighted average of the target web pages selection distributions of the more than one web pages selection rules wherein the plurality of predicted rates of occurrence of desired user actions are used as weights. The interim target web pages selection distribution may define for each of the plurality of web pages a percentage of the network requests for which it be selected.

Optionally, the plurality of statistic features comprises at least one feature selected from a group consisting of: a number of selected web page indications associated with a specific web page, a number of desired user action indications associated with a specific web page, a total number of selected web page indications, a total number of desired user action indications, an average number of desired users actions per number of web pages, and a rate of desired user actions occurred responsive to selection of each web page.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system which may employ application programs that are managed by the operating system. It should be understood by one of ordinary skill in the art that embodiments of the invention can be implemented using various computer devices, such as personal computers, servers, and other devices that have processors or that are capable of executing programs or sets of instructions. In general, the invention can be implemented using existing hardware or hardware that could be readily created by those of ordinary skill in the art. Thus, the architecture of exemplary devices has not always been explained in detail.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory of any type for storing instructions and/or data and/or a non-volatile storage, for example, a magnetic hard-disk, flash memory, and/or removable media, for storing instructions and/or data. The processor can be a type of microprocessor, a programmable logic control, an application specific integrated circuit, or a computing device configured to fetch and execute instructions.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the present invention may be practiced.

In the drawings.

DESCRIPTION OF EMBODIMENTS OF THE INVENTION

The present invention, in some embodiments thereof, relates to method and system of rule generation, or more particularly, but not exclusively, to method and system of rule generation and maintenance, and of selecting landing pages based on browsing data received from a user terminal. The browsing data is typically received in a network request, for example a HTTP request, originated from a user terminal and sent over a computer network (e.g., the Internet). The network request may for example reflect user attempt to view a webpage, to search a database, to access network resources, or the like. In some embodiments of the present invention the network request is a request for promotional content for which a suitable landing page is selected and provided to the user.

The browsing data received in a network request is analyzed and characterizing features extracted from the network request, and/or associated with the network request, are used for matching it with one or more landing pages selection rules (also referred to herein as web pages selection rules) used to determine a suitable landing page to be presented to a user operating the user terminal. Each landing pages selection rule comprises a rule condition and a target landing pages selection distribution. The target landing pages selection distribution is selected to increase the chances for a desired user action (e.g., conversion) to occur responsive to the provision of the selected landing page. The rule condition may define one or more criterions for matching a landing pages selection rule with characterizing features associated with received network requests, optionally, the rule condition defines one or more characterizing features (and/or suitable characterizing features ranges).

As used herein, a desired user action means a reaction to a landing page of a promotional content of a campaign (e.g., conversion), such as purchasing, printing, downloading, renting, leasing, subscribing, visiting and the like. The action may be taken immediately after the landing page is presented and/or after a period of time, for example when the user visits a store and/or a website.

A characterizing feature of a network request is a feature which is indicative of the modus operandi and/or web surfing patterns of users. For example, a characterizing feature may be a target address of a hosting site (e.g., VurlId), an origin webpage from which the user address the hosting site, an item (e.g., banner) clicked by the user (e.g., CreativeId), an internet protocol (IP) address of a user terminal, search terms used by the user (e.g., KeyWordId) in the network request, user's country or geographic region (e.g., CountryId), the network source of a network request (e.g., TrafficSource), temporal data, such as day of the week and/or a time period, for example morning, evening, or night, time of the month, and the like. Of course, the characterizing features pertaining to time period, time of day, week day, month decade, and the like, can be determined without requiring analysis of the browsing data of the received network request, for example, by recording the time of receipt of the network request.

The characterizing features of a network request may be associated with a selected landing page indication (marked herein as $LP_1$, $LP_2$, . . . , or $LP_K$), and a desired user action indication (e.g., "NONE", "PURCHASE", "PRINT", "DOWNLOAD", "SUBSCRIBE", and the like"; or a type of "YES"/"NO" Boolean indication), wherein both indications are associated with the same network request. The selected landing page indication is used to specify which one of the plurality of landing pages was selected responsive to the received network request. The desired user action indication is used to specify occurrence of a desired user action after directing the user terminal from which the network request was received to the selected landing page.

As used herein, and for brevity, a hosting site means network accessible devices and platforms (such as network servers) wherein network accessible content (such as a webpage, a video file having active links and/or banners, an audio file having active links and/or banners, a podcast having active links and/or banners, a WORD document, a portable document format (PDF), a spreadsheet, an extensible markup language (XML) page, a hypertext markup language (HTML) page) is electronically stored.

For clarity, a certain advertising campaign may be for promoting a product, a service, a website, a show, a movie, and the like. The landing pages may be hosted in a database or a server managed by the system (17 in FIG. 1) and/or in a third party server. Each one of the campaigns is associated with a plurality of landing pages, for example 2, 3, 5, 10, 20, 50, and/or any intermediate or larger number. Optionally, for each one of the campaigns, a set of landing pages selection rules are used to enforce desirable distributions of landing pages selections.

According to some embodiments of the present invention a campaign may be started with a default landing pages selection rule and a plurality of landing pages. During the initial stages of the campaign the default landing pages selection rule may be used for selecting a landing page from the plurality of landing pages for each network request received. Characterizing features identified for each network request received may be recorded together with the respective indications, for example, a selected landing page indication and a respective desired user action indication associated with the network request.

A set of landing pages selection rules may be generated whenever a certain amount of desired user action indications is accumulated. The set of rules may be generated by analyzing the characterizing features identified for the previously received network requests and identifying common repeated patterns in them. To each identified repeated pattern a set of respective indications may be determined, and statistical features may be computed based on the set of respective indications determined for the identified repeated pattern. The statistical features may be then used to decide for which of the identified repeated patterns a landing pages selection rule may be generated.

Optionally, a landing pages selection rule is generated for an identified repeated pattern if its statistical features satisfy a rule creation condition. An example for such a rule creation condition is a requirement of a certain number of desired user action indications in a set of respective indications determined for the identified repeated pattern (RuleTh in FIG. 3A). In such a requirement a predetermined threshold of desired user action indications may be set arbitrarily according to campaign requirements and/or dynamically based on parameters of the landing pages selection rule.

A landing pages selection rule may be defined by a rule condition and a target landing pages selection distribution. The rule condition may be based on the identified repeated pattern, and in these cases the repeated pattern of characterizing features is used for matching a landing pages selection rule with new network requests. The target landing pages selection distribution may be defined based on the statistical features determined for the identified repeated pattern of the landing pages selection rule. Optionally, the target landing pages selection distribution is defined by a set of probabilities computed based on the statistical features. The computed probabilities may be optimized (also referred to herein as optimized probabilities). Optionally, the optimization criterion is to maximize the predicted rate of occurrence of desired user actions of each landing pages selection rule.

The generation of a set of landing pages selection rules optionally further comprises computation of a predicted rate of occurrence of desired user actions. The computation of the predicted rate of occurrence of desired user actions may be based on the statistical features and the computed set of probabilities. Optionally, a target landing pages selection distribution is defined according to the computed set of probabilities and/or the predicted rate of occurrence of desired user actions.

In some embodiments of the present invention the target landing pages selection distribution is determined from a weighted average of two or more sets of probabilities. In these embodiments each instance of the set of probabilities is calculated based on a different set of statistical features and/or respective indications determined for the repeated pattern. Optionally, each set of statistical features and/or respective indications is associated with network requests which were received during a predetermined time window. The weighted average computation may comprise two or more corresponding predicted rates of occurrence of desired user actions values calculated based on the same sets of statistical features and/or respective indications (i.e., based on data obtained within the same time windows), which may be used as the weights in the weighted average computation. For example, each weighted average computation may be based on first and second sets of probabilities and on corresponding first and second calculated predicted rates of occurrence of desired user actions which are used as weights. Optionally, the computation of the first set of probabilities and of the first predicted rate of occurrence of desired users actions is carried out based on statistical features determined for network requests accumulated since the beginning of the campaign, and the second set of probabilities and of the second predicted rate of occurrence of desired users actions is carried out based on statistical features determined for network requests accumulated over a predetermined recent time window.

In some embodiments of the present invention the generation of a set of landing pages selection rules includes validation. By validating, landing pages selection rules which do not conform to a predefined rule approval policy are removed. The rule approval policy may define removal of a new landing pages selection rule which rule condition includes or covers a rule condition of another landing pages selection rule if the predicted rate of occurrence of desired user actions of the new landing pages selection rule is smaller than a rule validation threshold.

The validated landing pages selection rules may be sorted in a descending order according to their predicted rate of occurrence of desired user actions. In this way, when attempting to find a matching landing pages selection rule the scanning of the landing pages selection rules may be started with the landing pages selection rules having the greatest predicted rates of occurrence of desired user actions, thereby improving the chances to yield a desired user action in the landing page selection process.

Before explaining at least one embodiment of the present invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. For instance, while the hereinbelow description mainly pertains to rule sets for landing pages selection, it should be understood that the invention may be similarly employed for selecting other types of web pages, or other content types (e.g., images, audible content, video, and the like), without departing from the spirit and scope of the invention.

Figure 1:
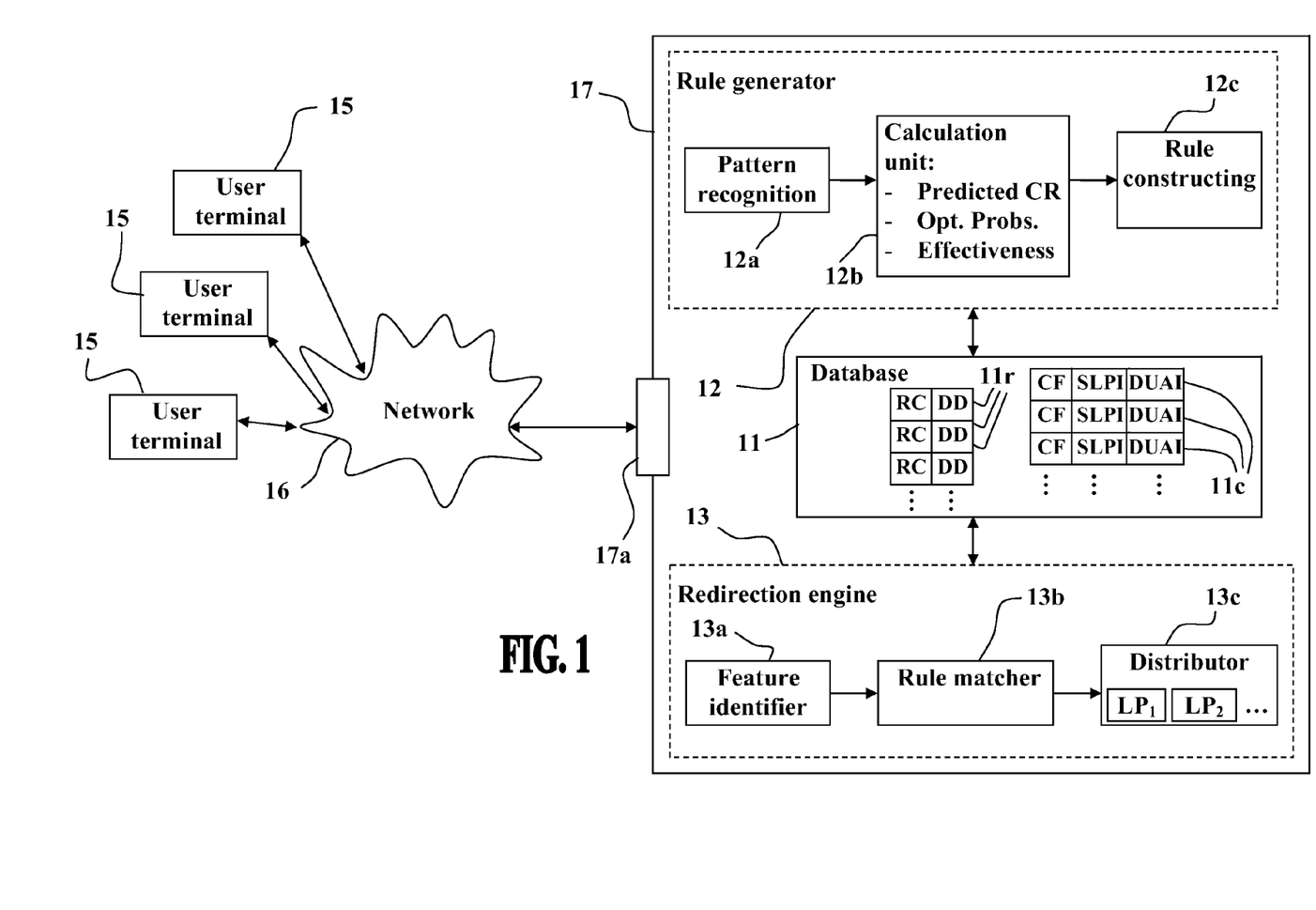
FIG. 1 is a block diagram illustrating a rule generation and utilization system, according to some embodiments of the present invention.

With reference to FIG. 1 wherein there is shown a system 17 of rule generation/adjustment and landing pages selection, which according to some embodiments of the present invention may be part of an advertisement platform. System 17, which may be implemented on one or more network servers, is linked to network 16 (e.g., computer network such as the Internet, wireless network such as cellular network) via a network interface 17a (e.g., a network interface card—NIC) that functions as an input unit allowing system 17 to communicate data with user terminals 15 over network 16. User terminals 15 may be implemented by any suitable network-enabled devices and platforms capable of communicating data over network 16 and displaying data and/or playing multimedia content, such as, but not limited to, personal computers (PCs), personal digital assistant (PDA) devices, mobile phones or portable media players. During operation network interface 17a may receive network requests (e.g., HTTP requests), for example, promotional content requests for a certain promotional content of a campaign, from the users operating user terminals 15. The network requests may be in the form of a click on a banner, an impression event, a submission of a search query, an impression for a search-engine result, a pass through event of a pointer, and the like. The network request may be received directly from user terminal 15 and/or from a server (not shown) managing a certain hosting site accessed by means of user terminal 15.

System 17 further includes a database 11, a redirection engine 13 and a rule generator 12 which are both adapted to exchange data with database 11. According to some embodiments of the present invention, no identifying information about the various network users which submit network requests is stored in the database. In such a manner, no definite statement is made, or can be made, about a particular user involved at any time. Redirection engine 13 may utilize feature identifier unit 13a, rule matcher unit 13b and distributor unit 13c, used in selecting a suitable landing page to each received network request. Rule generator 12 may employ pattern recognition unit 12a, calculation unit 12b and rule constructing unit 12c, for generating rules and updating existing rules if needed. As appreciated by those versed in the art, the various units of rule generator 12 and redirection engine 13 may be implemented by hardware (e.g., IC, SoC, ASIC, FPGA, and the like), or as software modules (e.g., machine binary code, java or perl scripts, and the like), or by combinations thereof.

Redirection engine 13 is adapted to receive and analyze network requests received via network interface 17a. In some embodiments of the present invention, characterizing features of each received network request are identified in feature identifier unit 13a. The identified characterizing features may be extracted from browsing data comprised in the received network requests and/or from any other data associated with the network request (e.g., day time period, month decay, and the like). The identified characterizing features are used by rule matcher unit 13b to select one or more suitable landing pages selection rules to be used by distributor unit 13e in selecting a suitable landing page ($LP_1, LP_2, \ldots, LP_K$) to be provided to the user terminal 15 from which the network request originated. In this way redirection engine 13 is adapted to direct greater ratios of the network requests to landing page(s) that statistically found as having relatively high rates of occurrence of desired user actions.

As used herein, a landing page means a single landing page, a microsite, and/or a conversion path. The network requests may include pre click data, impression data, such as hosting site address and banner identification, and/or post impression data, such as landing page activity, and/or a request for receiving such impression data from an external source, such as the server that hosts the hosting sites. For example pre-click information may be based on the HTTP header of the network request and/or related data received from an advertisement server (not shown) that provides the network request to system 17, for example via a URL query string.

The data recorded in database 11 may comprise a plurality of data records 11e each of which is associated to a specific network request received in system 17 and comprising the characterizing features (CF) identified by feature identifier 13a, and respective indications, such as for example, a selected landing page indication (SLPI) as selected by distributor unit 13e based on the identified characterizing features, and a desired user action indication (DUAI). The desired user action indication is typically observed and recorded sometime later after the landing page selection process.

The data records 11e of database 11 may be used by rule generator 12 to generate and update the landing pages selection rules 11r, which are optionally also maintained in database 11. Rule generator 12 may utilize pattern recognition unit 12a to analyze the characterizing features in the data records 11c of database 11 and identify groups of data records having common repeated patterns of characterizing features. A repeated pattern of characterizing features identified by pattern recognition unit 12a may be used to define a rule condition. Calculation unit 12b may be then utilized to process data set of respective indications determined for each group of data records identified by pattern recognition unit 12a, in order to determine and compute statistical features related to each identified group of data records. The rule condition (RC) is utilized by rule matcher unit 13b for determining one or more landing pages selection rules matching with identified characterizing features identified for a network request by features identifier unit 13a. The statistical features are used to define a target landing pages selection distribution (DD), which is employed by distributor unit 13c in selecting a suitable landing page.

The repeated patterns of characterizing features may be identified by means of conventional pattern recognition techniques, optionally, by means of data mining tools, such as defined in Data Mining: Practical Machine Learning Tools and Techniques, Second Edition (Morgan Kaufmann Series in Data Management Systems) by Ian H. Witten and Eibe Frank, 2005, which is incorporated herein by reference. A repeated pattern of characterizing features may comprise similar or identical parameters (i.e., characterizing features), or ranges thereof, comprised in, or associated with, a number of received network requests recorded in database 11. In some embodiments of the present invention the number of parameters tested in the pattern recognition step is limited to up to a number of parameters, for example five, and accordingly, in certain embodiments of the present invention the number of characterizing features recorded in each data record may be also limited to a certain number, for example five.

In some embodiments of the present invention calculation unit 12b may be adapted to compute for each landing pages selection rule (i.e., based on the set of respective indications in the data records complying with the rule condition) at least the following statistical features:
for each landing page a probability of a rate of occurrence of desired user actions;
a predicted rate of occurrence of desired user actions; and
rule effectiveness evaluation values.

Next, landing pages selection rules are defined by rule constructing unit 12c by determining respective target landing pages selection distributions to the identified repeated patterns. The rules' conditions are then checked by rule constructing unit 12c and landing pages selection rules not complying with a predefined rule approval policy are removed. The evaluated effectiveness values may be used by rule constructing unit 12c to further validate the landing pages selection rules. For example, rule constructing unit 12c may be adapted to remove landing pages selection rules which evaluated effectiveness values are too small according to the rule approval policy. After the rules validation stage the remaining (validated) landing pages selection rules are sorted by rule constructing unit 12c and stored in database 11 in a descending order in accordance with the computed predicted rate of occurrence of desired user actions of each landing pages selection rule.

System 17 further comprises an output unit, which may be implemented by network interface 17a. The output unit is optionally adapted to provide the selected landing pages and/ or links thereto in response to the network request, thereby facilitating the presentation thereof to the user terminals 15. As would be apparent to one of ordinary skill in the art network 16 may be implemented by one or more networks or communication systems, such as the Internet, telephone systems, wireless networks, satellite networks, cable TV networks, and various other private and public networks, could be used in various combinations to provide the communication links desired or needed to create embodiments or implementations of the present invention. Thus, the invention is not limited to any specific network or combinations of networks.

Figures 2, 3A:
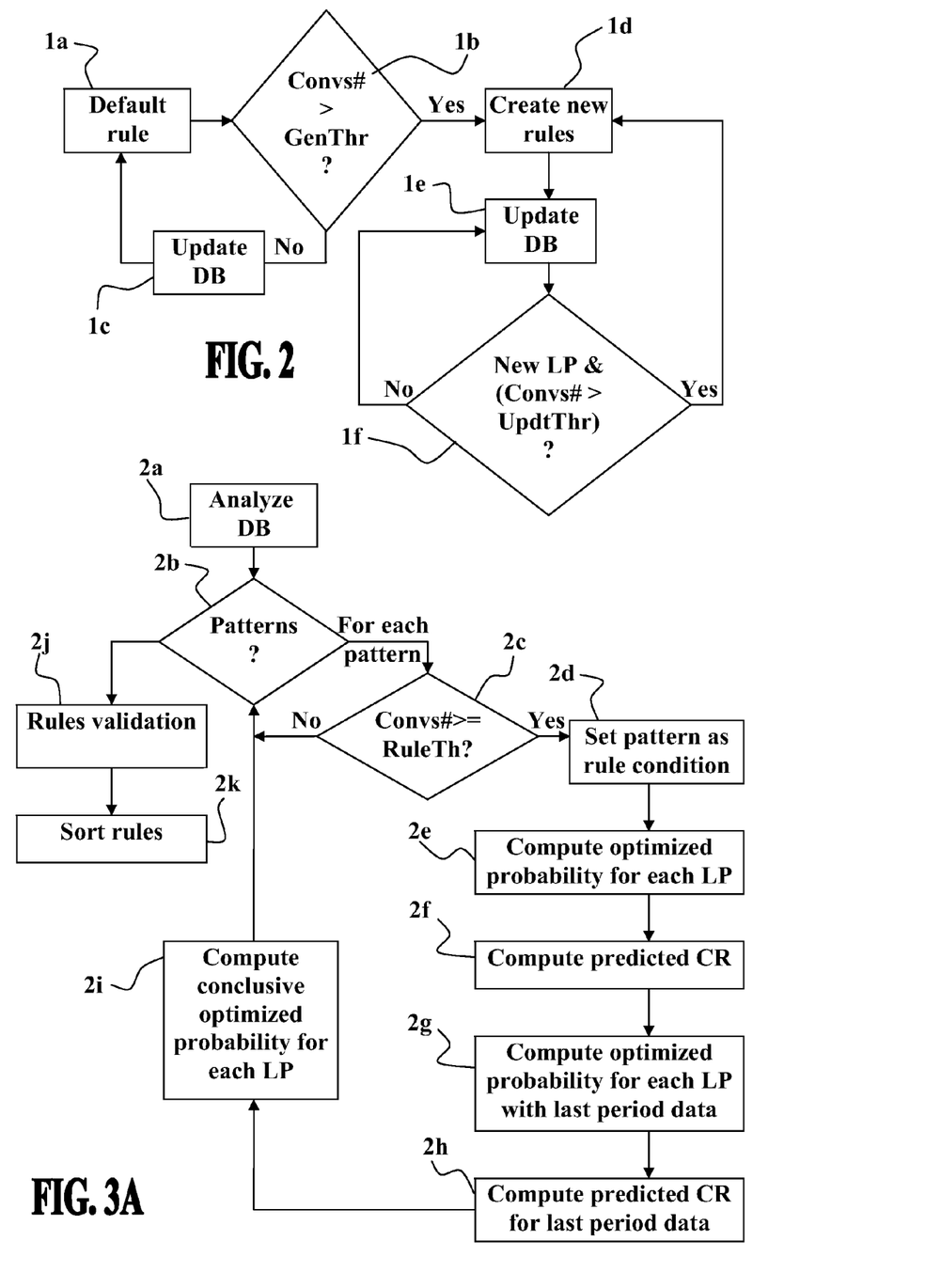
FIG. 2 is a flow chart illustrating rule generation and update process, according to some embodiments of the present invention.
FIG. 3A is a flowchart illustrating a process of rule set generation, according to some embodiments of the present invention.

FIG. 2 is a flow chart schematically illustrating steps involved in an optional campaign managed by system 17. In optional embodiments of the present invention the campaign is started with a default landing pages selection rule 1a which is initially used for selecting the landing pages in response to all network requests received in system 17, and later on for selecting landing pages to network requests for which no matching landing pages selection rule was determined. Default landing pages selection rule 1a is typically defined before any substantial data is recorded in database 11, such that it may be an arbitrary landing pages selection rule. By way of a non-limiting example, default landing pages selection rule 1a may initially define a uniform distribution of landing pages selection which results in distributor 13c initially allocating equal portions of the network requests traffic among the plurality of landing pages used in the campaign e.g., if the campaign is initiated with three landing pages $LP_1$, $LP_2$ and $LP_3$, the network requests traffic may be initially equally distributed by the default landing pages selection rule a follows: $LP_1$—33.3%, $LP_2$—33.3% and $LP_3$—33.3%.

As indicated in step 1b during the initial stage in which default rule 1a is used the total number of desired user action indications (denoted as Convs# in the FIGS) is monitored to determine if it exceeds a predetermined rule generation threshold (GenThr). The predetermined rule generation threshold may express the required number of desired user actions, and may generally be in the range of 200 to 300, optionally about 250. As indicated in 1c during this initial stage of the campaign database 11 is continuously updated with new records 11c of data comprised of the characterizing features (CF) identified by redirection engine 13 from new network requests, and their respective selected landing pages indications (SLPI) and desired user action indications (DUAI). When it is determined in step 1b that the total number of desired user actions is greater than the predetermined rule generation threshold, a new set of landing pages selection rules is generated in step 1d according to the data records 11c accumulated in database 11.

Step 1c may further comprise adjusting the default landing pages selection rule 1a if the data records 11c accumulated in database 11 reflect that certain landing pages yielded more desired user actions than other pages. In such case the landing pages distribution defined by the default landing pages selection rule may be updated such that the landing pages yielding more desired user actions are provided in response to greater ratios of the received network requests. In one optional embodiment of the present invention the default landing pages selection rule is updated on a daily basis according to the data records 11c accumulated in database 11.

After a new set of landing pages selection rules is generated in step 1d, in steps 1e and 1f the operation of system 17 proceeds utilizing the new set of landing pages selection rules. As explained hereinbelow, the default landing pages selection rule 1a may be used together with the new set of landing pages selection rules generated in step 1d, and both landing pages selection rules 1a and 1d are optionally continuously updated according to the data records 11c accumulated in database 11. As new network requests are received and processed in step 1e corresponding new data records are created and recorded in database 11, and the landing pages selection rules used may be also updated in order to adjust the landing pages selection rules to the accumulated data. In one optional embodiment of the present invention the landing pages selection rules may be updated on a daily basis according to the accumulated data records.

Whenever a new landing page is added to the campaign the landing pages selection rules are adjusted for directing a certain ratio of the network requests to the newly added landing page. New target landing pages selection distributions and new predicted rates of occurrence of desired user actions may be computed based on data records of the newly added landing page. Step 1d may be carried out again whenever it is determined in step 1f that the total amount of new desired user actions occurred since the addition of the new landing page is greater than a predetermined threshold for rule update (UpdtThr), which will result in generation of a new set of landing pages selection rules. The predetermined threshold for rule update may generally be in the range of 200 to 300, optionally about 250. Alternatively, the predetermined threshold may be set to equal, or range about, the rule creation threshold (RuleTh, in FIG. 3A) discussed hereinbelow.

FIG. 3A is a flowchart illustrating steps performed by rule generator 12 according to some embodiments of the present invention. For example, when generating new landing pages selection rules in step 1d in FIG. 2. This process is started in step 2a in analyzing the records 11c in database 11 to identify repeated patterns of characterizing features by means of pattern recognition unit 12a. In this step the characterizing features (CF) of all records 11c are scanned and groups of records having common characterizing features are identified. Based on sets of respective indications in the data records complying with each of the identified groups of data records a respective dataset is prepared comprising at least the following data: i) for each landing page the number of received network requests responsive to which the landing page was provided; and ii) the number of desired user action indications accumulated for each landing page. Next, for each of the identified groups of data records it is checked in step 2c whether the total number of desired user action indications in the identified group of data records is greater than or equals to a predetermined threshold for rule creation (RuleTh), and if so, steps 2d to 2i are carried out. On the other hand, if the condition in step 2c is not met, the control is returned to step 2b and the condition for rule creation is checked for the next identified group of records. Steps 2a to 2c may be carried out by pattern recognition unit 12a, steps 2d to 2i by calculation unit 12b, and steps 2j and 2k by rule constructing unit 12c.

In some embodiments of the present invention the predetermined threshold for rule creation (RuleTh) used in step 2c may be set as a function of the number of landing pages (LP#=K is an integer) used in the campaign. For example, the rule creation threshold may be in the range of values obtained by multiplying the number of landing pages by a predetermined parameter (Par), i.e., RuleTh≤Par·LP#, wherein Par is an integer number optionally in the range 5≤Par≤9. The value of the predetermined parameter Par may be set as a function of the total rate of occurred desired user actions for all the landing pages used in the campaign at a certain point of time (also referred to herein as campaign rate for brevity), for example:

Par=5, if campaign rate is less than 1%;
Par=6, if campaign rate is between 1% and 3%;
Par=7, if campaign rate is between 3% and 10%; and
Par=9, if campaign rate is greater than 10%.

However, any other suitable integer value may be used as a rule creation threshold such that it may be a preset constant value or an arbitrary value set according to campaign requirements.

Whenever the condition for rule creation in step 2c is met, in step 2d the identified repeated pattern of the group is set as the rule condition and the statistical features of the landing pages selection rule are determined and calculated in steps 2e to 2i, as follows:

in step 2e for each landing page an optimized probability of desired user actions rate (e.g., conversion rate) is computed based on data taken from the entire dataset of the identified group of data records;

in step 2f a predicted rate of occurrence of desired user actions for the landing pages selection rule is computed (predicted CR e.g., predicted conversion rate) based on data taken from the entire dataset of the identified group of data records, optionally, based on the rates of desired user actions of each of the landing pages and the optimized probabilities computed in step 2e;

in step 2g for each landing page an optimized probability of a rate of occurrence of desired user actions is computed in a similar way as in step 2e but using only data from the dataset which been recorded in database 11 within a predetermined recent period of time (also referred to as last period data);

in step 2h a predicted rate of occurrence of desired user actions for the landing pages selection rule is computed in a similar way as in step 2f but using only the last period data as in step 2g; and in step 2i a conclusive optimized probability is computed for each landing page based on the values computed in steps 2e to 2h.

The last period data may be arbitrarily defined by system 17 according to campaign requirements. For example, the last period data may be defined to include data recorded within the last 1 to 3 months, or within intermediate or longer terms. In some embodiments of the present invention the last period term may be dynamically set, for example, as a function of the number of landing pages used in the campaign. For example, the last period data may be defined to include data recorded within the last number of days in the range obtained by multiplication of the number of landing pages in the campaign by 56 and 84 (>56·LP# and <84·LP#), for example, optionally about the number of landing pages multiplied by 70 (70·LP#).

In some embodiments of the present invention the computed conclusive optimized probabilities may be used by system 17 to define the target landing pages selection distribution to be enforced by distributor unit 13c according to which received network requests complying with the rule condition are distributed over the plurality of landing pages. In other words, in this manner to each network request received in system 17 a landing page is selected in a way satisfying the target landing pages selection distribution defined by the conclusive optimized probabilities computed for the matching rule. It is noted that in some embodiments of the present invention rules statistical features may be computed using only steps 2e and 2f i.e., without carrying out steps 2g to 2i. In such cases the optimized probabilities computed in step 2e may be used by distributor 13c as the conclusive optimized probabilities used for selecting the landing pages.

After creating the landing pages selection rules in steps 2b to 2i for all identified repeated patterns, in step 2j the rule conditions of the landing pages selection rules are validated and landing pages selection rules found to be redundant and not satisfying rule approval criterions are removed. Thereafter, in step 2k, the remaining (validated) landing pages selection rules are sorted and recorded in database 11 in a descending order according to the predicted rate of occurrence of desired user actions computed for each landing pages selection rule in step 2f.

By way of a non-limiting example, initially in steps 2a and 2b the dataset constructed for each identified repeated pattern (numbered by the integer p=1, 2, 3, . . . ) may be comprised from at least the following data extracted from database records complying with the identified pattern of the landing pages selection rule: a) for each landing page $LP_i$ (where i=1, 2, 3, . . . , K is an integer) the number of desired user action indications ($m_i^{(p)}$); and b) for each landing page $LP_i$ the number of network requests ($n_i^{(p)}$) indications. The dataset extracted for each landing pages selection rule may be then used for computing rule statistical features. For example, based of the dataset extracted for each identified pattern p calculation unit 12b may compute:

the total number of received network requests $$\left(N^{(p)} = \sum_{i=1}^{K} n_i^{(p)}\right);$$

for each landing page $LP_i$ the rate of desired user actions which occurred responsive to its selection ($C_i^{(p)} = m_i^{(p)} / n_i^{(p)}$, e.g., conversion rate); and the total number of desired user action indications in $$\left(M^{(p)} = \sum_{i=1}^{K} m_i^{(p)}\right).$$

These statistical features may be then used in step 2c to determined whether the identified repeated pattern p qualifies for rule creation, for example, by checking if the total number ($M^{(p)}$) of desired user action indications in the dataset p is greater than or equals to the predetermined threshold for rule creation (i.e., $M^{(p)} \geq$ RuleTh).

Figure 3B:
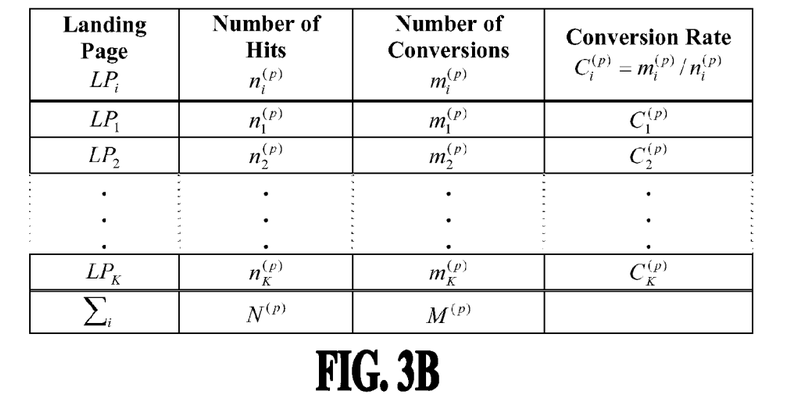
FIG. 3B exemplifies possible set of initially extracted and computed values for identified repeated patterns, according to some embodiments of the present invention.

A table exemplifying a dataset comprising extracted and computed values for identified repeated pattern p according to some embodiments of the present invention is shown in FIG. 3B. For each identified repeated pattern p satisfying the rule creation condition in 2c a corresponding landing pages selection rule may be created by setting the identified repeated pattern p as the rule condition in step 2d, and then computing further statistical features in steps 2e to 2i which are used for setting the target landing pages selection distribution of the landing pages selection rule.

According to some embodiments of the present invention the further statistical features are computed by calculation unit 12b, as follows:

Optimized Probabilities

For each landing page $LP_i$ (i=1, 2, 3, . . . , K) the optimized probability $op_i^{(p)}$ of rate of occurrence of desired user actions may be computed based on the corresponding rate of occurred desired user actions $C_i^{(p)}$ computed for the landing page $LP_i$ from the dataset of landing pages selection rule (p). Optionally, a reliability factor $R^{(p)}$ is determined for each landing pages selection rule p which may define an aggressive level for calculating the optimized probabilities. For example, according to some embodiments of the present invention the rule reliability factor $R^{(p)}$ may be used as an exponent, such that the optimized probabilities $op_i^{(p)}$ may be computed by raising the rate of occurred desired user actions $C_i^{(p)}$ to the power of the determined rule reliability factor i.e., $op_i^{(p)} = C_i^{(p)\wedge} R^{(p)}$ (i=1, 2, 3, . . . , K).

The rule reliability factor $R^{(p)}$ may be set arbitrarily for each landing pages selection rule according to campaign requirements, for example, or be dynamically adjusted for each landing pages selection rule according to one or more factors related to the landing pages selection rule. According to some embodiments of the present invention the rule reliability factor $R^{(p)}$ is set as a function of the average rate $\overline{m}^{(p)}$ of occurred desired user actions calculated based on the dataset of identified repeated pattern p. By way of a non-limiting example, the average rate $\overline{m}^{(p)}$ of occurred desired user actions may be calculated by calculation unit 12b by dividing the total number of desired user action indications ($M^{(p)}$, e.g., total number of conversions) in a dataset p by the total number of landing pages (K) in the campaign, i.e., $\overline{m}^{(p)} = M^{(p)}/K$.

In some embodiments of the present invention the rule reliability factor $R^{(p)}$ may be set by a piecewise linear function of the average of number of desired user action indications $\overline{m}^{(p)}$ computed from the dataset of the landing pages selection rule p. For example, a piecewise linear function having four pieces defined by different ranges of values of the average of number of desired user action indications $\overline{m}^{(p)}$ may be defined as follows:

if $\overline{m}^{(p)} \leq 8$ then $R^{(p)} = 0.5 + 0.1 \cdot (\overline{m}^{(p)} - 3)$
else if $\overline{m}^{(p)} \leq 33$ then $R^{(p)} = 1 + 0.04 \cdot (\overline{m}^{(p)} - 8)$
else if $\overline{m}^{(p)} \leq 163$ then $R^{(p)} = 2 + 0.015 \cdot (\overline{m}^{(p)} - 33)$
else $R^{(p)} = 3.95 + 0.011 \cdot (\overline{m}^{(p)} - 163)$ It is however clear that the rule reliability factor $R^{(p)}$ may be set in various other ways, for example, by a piecewise linear function having more (or less) pieces, or having one or more discrete, linear, or nonlinear functions, or combinations thereof.

In some embodiments of the present invention the calculation of optimized probabilities in step 2e employs all data records within the group of records complying with identified repeated pattern p which had accumulated in database 11 since the beginning of the campaign. Alternatively, the calculation of the optimized probabilities may be carried out employing only data records within the group of records complying with identified repeated pattern p which accumulated in database 11 within a predetermined duration of time, for example, within a recent number of months e.g., within the period of the last 1, 2, 3, 4, 5 or 6 months, or intermediate or longer time durations. In such some embodiments of the present invention the extracted data $m_i^{(p)}$ and $n_i^{(p)}$, and the statistic features $N^{(p)}$, $M^{(p)}$, $C_i^{(p)}$, $\overline{m}^{(p)}$, $R^{(p)}$, $op_i^{(p)}$, are calculated using database records accumulated within the predetermined time duration.

The computed optimized probabilities $op_i^{(p)}$ may be normalized, for example, as follows:

$$\acute{op}_j^{(p)} = 100 \cdot op_j^{(p)} \Big/ \left(\sum_{i=1}^{K} op_i^{(p)}\right)$$

(where j=1, 2, 3, . . . , K is an integer).

Predicted Rate of Occurrence of The Desired User actions

The predicted rate $pr^{(p)}$ of occurrence of desired user actions for each landing pages selection rule p may be computed as a weighted sum of the rates of occurred desired user actions $C_i^{(p)}$ computed for each landing page $LP_i$ in the dataset of landing pages selection rule p. According to some embodiments of the present invention the normalized optimized probability $$\hat{op}_j^{(p)}$$

computed for landing pages selection rule p for each landing page $LP_i$ (i=1, 2, 3, ..., K) may be used as weights for computing the weighted sum of the predicted rate of occurrence of the desired user actions, e.g., $$pr^{(p)} = \sum_{i=1}^{K} C_i^{(p)} \cdot \hat{op}_i^{(p)}.$$

In some embodiments of the present invention the calculation of the predicted rate of occurrence of desired user actions in step 2f employ all data records within the group of records complying with identified repeated pattern p which accumulated in database 11 since the beginning of the campaign. Alternatively, the calculation of the predicted rate of occurrence of desired user actions may be carried out employing only data records within the group of records complying with identified repeated pattern p which had accumulated in database 11 within a predetermined duration of time, for example, within a recent number of months e.g., within the last 1, 2, 3, 4, 5 or 6 months, or within intermediate or longer time durations.

Last Period Computations

As explained hereinabove, the computations of optimized probabilities and predicted rate of occurrence of desired user actions carried out in steps 2g and 2h is based on database records accumulated over a predetermined recent period of time. Accordingly, in these steps a corresponding last period dataset may be extracted to comprise for each landing page $LP_i$ (i=1, 2, 3, ..., K) at least: the number of desired user action indications $m_i'^{(p)}$ recorded over the predetermined recent period of time, and the number of network requests $n_i'^{(p)}$ received during the recent period of time and for which landing page $LP_i$ was selected. Based on the last period data extracted for identified repeated pattern p corresponding characterizing features may be computed for: the total number of received network requests $$N'^{(p)} = \sum_{i=1}^{K} n_i'^{(p)},$$

the total number of desired user action indications $$M'^{(p)} = \sum_{i=1}^{K} m_i'^{(p)},$$

average number of occurred desired user actions $\overline{m}'^{(p)} = M'^{(p)}/K$, rule reliability factor $R'^{(p)}$ (as described above but based on the average number of occurred desired user action indications $\overline{m}'^{(p)}$ based on last period dataset), and for each landing page $LP_i$: the rate of occurred desired user actions $C'_i^{(p)} = m_i'^{(p)}/n_i'^{(p)}$; optimized probability $op_i'^{(p)} = C'_i^{(p)} \hat{} R'^{(p)}$; normalized optimized probability $$\hat{op}_i'^{(p)};$$

and predicted rate of occurrence of desired user actions $$pr'^{(p)} = \sum_{i=1}^{K} C_i'^{(p)} \cdot \hat{op}_i'^{(p)}.$$

Conclusive Optimized Probability

According to some embodiments of the present invention the conclusive optimized probabilities computed in step 2i is a weighted average of the optimized probabilities computed in steps 2e and 2g. For example, the conclusive optimized probabilities $OP_i^{(p)}$ may be calculated as the weighted average of the optimized probabilities $OP_i^{(p)}$ computed based on the entire dataset extracted for rule p and the optimized probabilities $op_i'^{(p)}$ computed based on the last period data in data records of landing pages selection rule p. Optionally, the predicted rate of occurrence of desired user actions $pr^{(p)}$ computed based on the entire dataset extracted for landing pages selection rule p (in step 2f) and predicted rate of occurrence of desired user actions $pr'^{(p)}$ computed based on the last period data of landing pages selection rule p (in step 2h) are used as the weights in the weighted average computation e.g., $$OP_i^{(p)} = (pr^{(p)} \cdot op_i^{(p)} + pr'^{(p)} \cdot op_i'^{(p)})/(pr^{(p)} + pr'^{(p)}), i = 1,2,3,\ldots,K.$$

In some embodiments of the present invention the conclusive optimized probabilities may be computed as a weighted average of a plurality of sets of optimized probabilities $op_i^{(p)}$, $op_i'^{(p)}$, $op_i''^{(p)}$, $op_i'''^{(p)}$, ... computed using datasets extracted for various time windows. Correspondingly, in such embodiments a plurality of predicted rates of occurrence of desired user actions values $pr^{(p)}$, $pr'^{(p)}$, $pr''^{(p)}$, $pr'''^{(p)}$, ... computed based on the corresponding datasets may be used as weights, e.g., $$OP_i^{(p)} = \frac{(pr^{(p)} \cdot op_i^{(p)} + pr'^{(p)} \cdot op_i'^{(p)} + pr''^{(p)} \cdot op_i''^{(p)} + pr'''^{(p)} \cdot op_i'''^{(p)} \ldots)}{(pr^{(p)} + pr'^{(p)} + pr''^{(p)} + pr'''^{(p)} + \ldots)},$$

$$i = 1, 2, 3, \ldots, K$$

The conclusive optimized probabilities $OP_i^{(p)}$ may be used by distributor unit 13c in selecting the landing pages. More particularly, the computed conclusive optimized probability of the landing pages selection rule may be used by distributor unit 13c as the target landing pages selection distribution according to which received network request complying with the rule condition be distributed between the plurality of landing pages. For example, assuming the computed conclusive optimized probabilities of rule p ($OP_i^{(p)}$) in a campaign comprising three landing pages ($LP_i$, i=1, 2, 3) are—$OP_1^{(p)}$=20%, $OP_2^{(p)}$=55% and $OP_3^{(p)}$=25%, the target landing pages selection may be then set accordingly to—$LP_1$—20%, $LP_2$—55% and $LP_3$—25%.

Rules validation may be carried out in step 2j by determining whether rule conditions of one or more landing pages selection rules include, or cover, the rule conditions of other landing pages selection rules. For example, the validation step may comprise removal of any new landing pages selection rule which rule conditions include or already cover the rule condition of another landing pages selection rule (i.e. rule condition of the new landing pages selection rule is more complicated than the rule condition of the other landing pages selection rule), if its predicted rate of occurrence of desired user actions is smaller than a determined threshold. For example, if the rule condition of the new landing pages selection rule requires that network request comprise characterizing features "A", "B" and "C" and there is another landing pages selection rule which rule condition requires characterizing features "A" and "B", then the rule condition of the new landing pages selection rule is determined as more complicated and the new landing pages selection rule may be removed if its predicted rate of occurrence of desired user actions is smaller than a determined rule validation threshold.

The rule validation threshold may be set arbitrarily or dynamically. For example, in some embodiments of the present invention rule validation threshold may be calculated as a function of the predicted rate of occurrence of desired user actions of the other landing pages selection rule. By way of example, if the predicted rate of occurrence of desired user actions of the new landing pages selection rule is $pr^{(new)}$ and the predicted rate of occurrence of desired user actions of the other landing pages selection rule x, which rule condition is included or covered by the rule condition of the new landing pages selection rule, is $pr^{(x)}$, then the rule validation threshold may be defined as $pr^{(x)} \cdot (1+c)$, wherein c is a parameter generally in the range of 0.005 to 0.015, optionally about 0.01 i.e., the new landing pages selection rule may be removed if its rule condition covers the rule condition of landing pages selection rule x and if $pr^{(new)} < pr^{(x)} \cdot (1+c)$.

The landing pages selection rules may be periodically or routinely updated. Each landing pages selection rule may comprise status indications, such as, but not limited to, "new" or "updated", for example. The landing pages selection rules may be periodically or routinely scanned, and all landing pages selection rules having a new status indication, dependent and more complicated rule conditions (i.e., their rule conditions cover or include rule conditions of previously created landing pages selection rules) and having predicted rates of occurrence of desired user actions that are smaller than a calculated threshold, may be excluded from the set of landing pages selection rules.

Figure 3C:
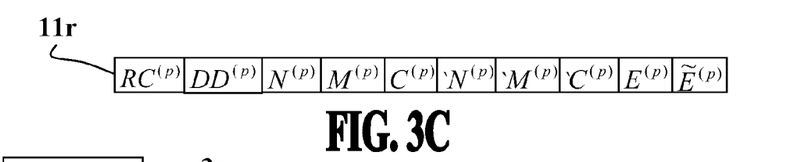
FIG. 3C exemplifies a landing pages selection rule according to some embodiments of the present invention.

As exemplified in FIG. 3C the landing pages selection rules $11r$ recorded in database 11 may comprise the rule condition $RC^{(p)}$, its target landing pages distribution $DD^{(p)}$, and indications of: the total number $N^{(p)}$ of network requests to which the rule conditions were matched since the beginning of the campaign (i.e., before creation of the first set of landing pages selection rules); the total number $M^{(p)}$ of desired user action indications, and rate $C^{(p)} = M^{(p)}/N^{(p)}$ of desired user actions which had occurred since the beginning of the campaign.

The recorded rules may comprise additional information which may be used in evaluating their ability to yield desired user actions. For example, in some embodiments of the present invention each recorded rule may comprise indications of: the total number of network requests $$`N^{(p)} = \sum_{i=1}^{K} `n_i^{(p)}$$

to which the landing pages selection rule was matched since the landing pages selection rule was created, wherein $`n_i^{(p)}$ is the number network request to which landing page $LP_i$ was matched since the landing pages selection rule was created; the total number $$`M^{(p)} = \sum_{i=1}^{K} `m_i^{(p)}$$

of desired user action indications recorded since the landing pages selection rule was created, wherein $`m_i^{(p)}$ is the number of desired users action indications which occurred responsive to selection of landing page $LP_i$ by the landing pages selection rule since it was created; rate $`C^{(p)} = `M^{(p)}/`N^{(p)}$ of desired user actions which had occurred responsive to landing pages selected by landing pages selection rule p since it was created; and effectiveness evaluation values.

The effectiveness evaluation values ($E^{(p)}$ and $\tilde{E}^{(p)}$ in FIG. 3C) may be also included in each landing pages selection rule $11r$. The effectiveness evaluation values may be periodically or routinely computed for each landing pages selection rule to reflect increments (optionally, the percentage of the increment) in the number of desired user actions obtained by applying the landing pages selection rule. For example, rules effectiveness may be evaluated by computation of the ratio between the increment of the number of desired user actions that occurred by applying the landing pages selection rule and the number of desired user actions occurred corresponding to a previously used target landing pages distribution. For example, the increment in the number of desired users action occurred since landing pages selection rule creation may be computed using the formula $$\Delta `M^{(p)} = \sum_{i=1}^{K} \left(`n_i^{(p)} - \overline{`n^{(p)}}\right) \cdot \left(C_i^{(p)} - \overline{C^{(p)}}\right),$$

wherein $`n_i^{(p)}$ is the number network request to which landing page $LP_i$ was matched since the landing pages selection rule was created, $\overline{`n^{(p)}} = `N^{(p)}/K$ is the average number of network requests per landing pages for which landing pages selection rule p was matched since it was created, $C_i^{(p)} = m_i^{(p)}/n_i^{(p)}$ the rate of desired user actions which occurred responsive to selection of page $LP_i$ since the beginning of the campaign, and $$\overline{C^{(p)}} = \left(\sum_{i=1}^{K} C_i^{(p)}\right) / K$$

is the average of rates of desired user actions which had occurred responsive to selection of landing pages by landing pages selection rule p since the beginning of the campaign per number of landing pages. The landing pages selection rule effectiveness $E^{(p)}$ may be then evaluated as follows—$E^{(p)} = 100 * \Delta `M^{(p)} / (`M^{(p)} - \Delta `M^{(p)})$.

The effectiveness evaluation values may comprise computed predicted effectiveness evaluation reflecting the predicted increase (optionally, the percentage of the expected increment) in number of desired user actions expected to occur responsive to use of the landing pages selection rule. For example, in some embodiments of the present invention the predicted effectiveness of landing pages selection rule p is evaluated as follow:

the number of network requests $\tilde{n}_i^{(p)}$ for which a landing page $LP_i$ is expected to be provided by the landing pages selection rule is evaluated by computing $\tilde{n}_i^{(p)} = {}^tN^{(p)} \cdot OP_i^{(p)}$, i=1, 2, 3, ..., K;

the expected rate of occurrence of desired user actions $\tilde{C}_i^{(p)}$ responsive to provision of landing page $LP_i$ by the landing pages selection rule p is evaluated by computing $\tilde{C}_i^{(p)} = \tilde{n}_i^{(p)} \cdot C_i^{(p)}$ i=1, 2, 3, ..., K;

the expected increment in the number of desired user actions is evaluated by computing $$\Delta \tilde{M}^{(p)} = \sum_{i=1}^{K} (\tilde{n}_i^{(p)} - \overline{n^{(p)}}) \cdot (\tilde{C}_i^{(p)} - \overline{C^{(p)}}),$$

wherein the average rate of desired user actions which had occurred responsive to selection of landing pages by landing pages selection rule p since the beginning of the campaign $\overline{C^{(p)}}$ and the average number of network requests per landing pages for which landing pages selection rule p was matched since it was created $\overline{n^{(p)}}$ are computed as explained hereinabove; and expected rule effectiveness may be then evaluated by the computation of $\tilde{E}^{(p)} = 100 * \Delta\tilde{M}^{(p)} / ({}^tM^{(p)} - \Delta\tilde{M}^{(p)})$.

The rules statistical features, optimized probabilities and/or effectiveness evaluations may be updated from time to time, for example, whenever a new landing page is added and/or whenever the number of new desired user actions which occurred since the last update is greater than some predetermined threshold. When a new (current) effectiveness evaluation $E_{current}^{(p)}$ value is computed, it may be used together with the previously computed rule effectiveness evaluation $E^{(p)}$ and the previously computed predicted rule effectiveness evaluation value $\tilde{E}^{(p)}$ for automatic rule approval and for issuing alerts.

For example, in some embodiments of the present invention whenever the new (current) effectiveness evaluation $E_{current}^{(p)}$ is of negative value ($E_{current}^{(p)} < 0$) an alert may be issued to indicate that rule adjustments may be required. In addition, the new effectiveness evaluation $E_{current}^{(p)}$ may be further used for approving the landing pages selection rule whenever it is greater than some effectiveness approval value which may be defined arbitrarily according to campaign expectations, or dynamically based on one or more of the landing pages selection rule parameters. By way of example, the rule approval may comprise determining whether the new effectiveness evaluation value $E_{current}^{(p)}$ is greater than the average of the previously computed effectiveness evaluation value $E^{(p)}$ and the previously computed predicted rule effectiveness evaluation $\tilde{E}^{(p)}$ i.e., if $E_{current}^{(p)} > (E^{(p)} + \tilde{E}^{(p)})/2$, and if so approving the landing pages selection rule.

Figure 4:
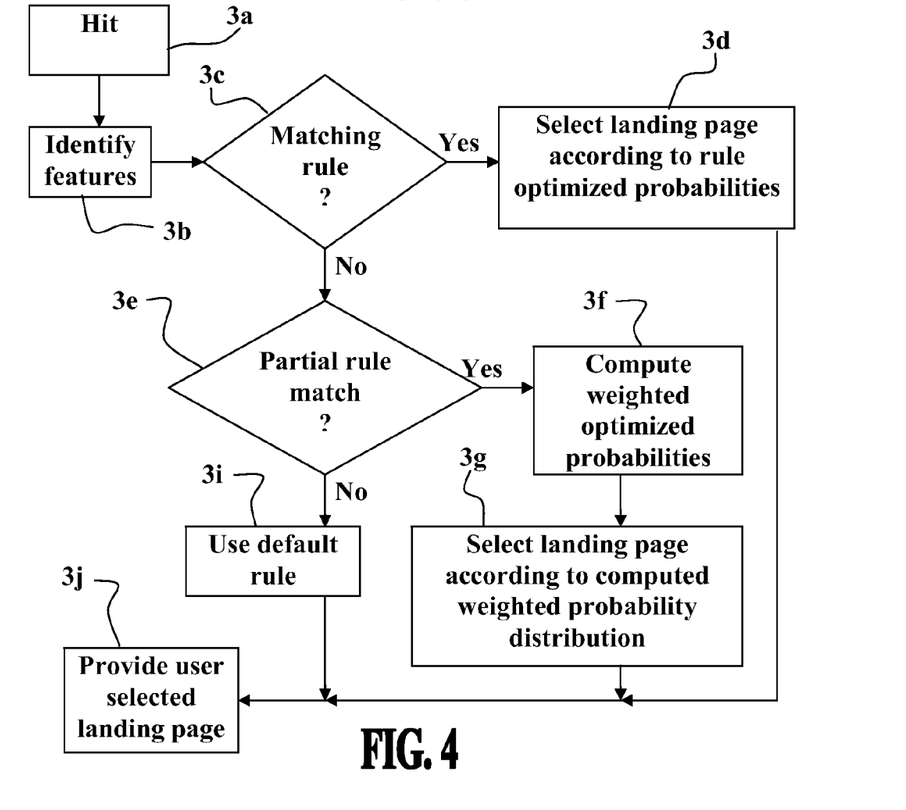
FIG. 4 is a flowchart illustrating a landing page selection process, according to some embodiments of the present invention.

FIG. 4 is a flowchart illustrating a landing page selection process, according to some embodiments of the present invention. The landing page selection is started in step 3a whenever a new network request (Hit) is received by the redirection engine 13. The network request is then analyzed in step 3b and characterizing features associated with it are identified by feature identifier unit 13a. In step 3c the landing pages selection rules in database 11 are scanned by rule matcher unit 13b to determine landing pages selection rules which rule conditions match with the identified characterizing features. There may be more than one matching rules, however, as explained before, the landing pages selection rules may be sorted in ascending order such that the landing pages selection rule having the greatest predicted rate of occurrence of desired user actions is selected. In step 3d the network request and the landing pages selection rule conclusive optimized probabilities may be transferred to distributor unit 13c which then selects a landing page conforming with the target landing pages selection distribution define by the landing pages selection rule and according to previous landing pages selections by the landing pages selection rule. The selected landing page may be then downloaded by the user terminal in step 3j. Accordingly distributor unit 13c is optionally designed to monitor the traffic related to all campaign landing pages and to enforce the landing pages selection rules' conclusive optimized probabilities it is provided with. For example, distributor 13c may choose the landing page based on the landing pages selection rules' conclusive optimized probabilities used as target landing pages selection distribution and by utilizing the data regarding previous landing pages selection by the landing pages selection rule e.g., as provided in the table of FIG. 3B.

If rule matcher unit 13b is unable to determine matching landing pages selection rules in step 3c, then in step 3e it is checked whether partially matching landing pages selection rules can be determined, which are then used in step 3f to compute interim optimized probabilities. The computed interim optimized probabilities may be used by distributor unit 13c in step 3g as target landing pages selection distribution in selecting the landing page to be provided to the user terminal in step 3j. If no partial matches are determined in step 3e, then in step 3i the default landing pages selection rule (default rule 1a in FIG. 2) is selected and its target landing pages selection distribution is used by distributor 13c to select the landing page to be provided to the user in step 3j.

According to some embodiments of the present invention the interim optimized probabilities may be computed as a weighted average of the optimized probabilities of the partially matching rules determined in step 3e. Optionally, the predicted rates of occurrence of desired user actions of the partially matching rules determined in step 3e are used as the weights in the weighted average computation. For example, assuming the extracted features of an exemplary network request comprises characterizing features "A" and "B", and that there is no matching rule having rule condition expressed as conjunction of features "A" and "B" (i.e., "A"&"B"), and that two partial matches are determined in step 3e—of a landing pages selection rule x having only characterizing feature "A" in its rule condition and a landing pages selection rule y having only characterizing feature "B" in its rule conditions, then in step 3f the interim optimized probabilities to be used with the network request may be computed as follows:

$$OP_i^{(interim)} = (Pr^{(x)} \cdot op_i^{(x)} + pr^{(y)} op_i^{(y)}) / (pr^{(x)} + pr^{(y)}), i = 1,2,3, \ldots, K.$$

Such interim optimized probability distribution may be also computed in step 3d, if in step 3c more than one landing pages selection rules fully match the identified characterizing features, however, the rule generation process of the present invention is designed to minimize the chances of such events.

A dynamic rule generation system is thus provided which continuously analyzes data accumulated during the campaign and updates the landing pages selection rules, and generates new rules, according to identified users' preferences, thereby increasing the chances for desired user actions to occur responsive to the landing pages selection process. As the campaign progresses and matures, the system continues to learn users' behavior, and adapts the landing pages selection rules to the variable combinations of characterizing features and browsing data obtained from the network requests, and to the progressively increasing statistic features, gathered throughout campaign duration.

As proved now, the minimum support for a landing pages selection rule (i.e., the minimum number of desired user actions necessary for creating a landing pages selection rule) may be effectively set to the multiplication of the number of landing pages by five (5*K). Assuming the average rate of occurrence of desired user actions is $\bar{p}$ (the average probability of rate of desired user actions), and that the number of network requests for a certain landing page $LP_q$ for an identified group of data records is n. For this landing page $LP_q$, the probability that among n network requests chosen randomly from the population having an average rate $\bar{p}$ of desired user actions there is no desired user actions responsive to landing pages selection is $(1-\bar{p})^n$, which expresses the error probability of landing page $LP_q$ not yielding any desired user actions. In statistics, a result is considered statistically significant if it is unlikely to have occurred by chance. The significance level is usually denoted by α. Typical levels of significance are 5% (0.05), 1% (0.01) and 0.1% (0.001). If a test of significance gives a p-value lower than the α level then such result is referred to as 'statistically significant'. In this case, the result is statistically significant, if the number of network requests n satisfies the following inequality:

$$(1-\bar{p})^n \le \alpha$$

Hence, the minimum number of network requests per landing page is equal to $$n = \frac{\ln \alpha}{\ln(1-\bar{p})},$$

and consequently, we minimum number of desired user actions per landing page is $$\frac{\bar{p} \cdot \ln \alpha}{\ln(1-\bar{p})}.$$

In a campaign employing a plurality of landing pages it may be worthwhile to set α=0.01. Therefore, the minimum average number m of desired user actions per landing page may be calculated as follows:

$$m = \frac{\bar{p} \cdot \ln 0.01}{\ln(1-\bar{p})} = \frac{-4.6 \cdot \bar{p}}{\ln(1-\bar{p})}$$

Table 1 below lists computed values of m for various values of $\bar{p}$.

TABLE 1

| $\bar{p}$ - average rate of occurrence of desired user actions | M - minimum number of desired user actions per landing page |
|---|---|
| 0.001 | 4.6 |
| 0.005 | 4.6 |
| 0.01 | 4.6 |
| 0.02 | 4.6 |
| 0.03 | 4.5 |
| 0.04 | 4.5 |
| 0.05 | 4.5 |
| 0.06 | 4.5 |
| 0.07 | 4.5 |
| 0.08 | 4.4 |
| 0.09 | 4.4 |
| 0.1 | 4.4 |

Accordingly, in some embodiments of the present invention the minimum support for a landing pages selection rule may be set to the multiplication of the number of landing pages used in the campaign by five (i.e., 5*LP#).

It is expected that during the life of a patent maturing from this application many relevant systems and methods be developed and the scope of the terms network request, characterizing features, campaign, impression, impression data, a server, a user terminal, a hosting site, and a promotional content is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as optional or advantageous over other embodiments and/or to exclude the incorporation of features from other embodiments.

The word "optionally" is used herein to mean "is provided in some embodiments and not provided in other embodiments". Any particular embodiment of the present invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the optional subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A web pages selection system for web pages selection mechanism comprising:
   a processor;
   a pattern recognition unit which analyzes a plurality of network requests to access a content having a plurality of landing pages and identifies a plurality of repeated patterns of characterizing features therein, said plurality of network requests are received from a plurality of browsers installed in a plurality of user terminals;
   a calculation unit which uses said processor to compute, for each said repeated pattern, a plurality of statistic features; and
   a rule constructing unit which defines a web pages selection rule for each of at least some of said plurality of repeated patterns, said web pages selection rule comprises at least one criterion for matching with characterizing features associated with at least one additional network request and a target web pages selection distribution set according to respective said plurality of statistic features, said target web pages selection distribution is set for distributing traffic derived from said at least one additional network request among said plurality of landing pages;
   a redirection engine which matches said web pages selection rule to said at least one additional network request according to respective said at least one criterion and automatically redirects a browser of another user terminal from which said at least one additional network request is received to one of said plurality of landing pages according to respective said target web pages selection distribution of said matched web pages selection rule;
   wherein the plurality of landing pages comprise campaign landing web pages comprising promotional content of a campaign;
   wherein said plurality of statistic features comprise a plurality of probabilities, each said probability is a probability of a rate of occurrence of desired user actions responsive to selection of a specific web page;
   wherein the target web pages selection distribution is defined based on the plurality of probabilities.

2. The web pages selection system of claim 1, wherein each one of said plurality of network requests is associated with a plurality of indications comprising, a selected web page indication specifying a web page that been selected responsive to said each network request, and a desired user action indication specifying occurrence of a desired user action responsive to provision of said web page.

3. The web pages selection system of claim 2, further comprising a database hosting the web pages selection rules and a plurality of data records, each said data record comprises respective characterizing features identified for the one of said plurality of network requests and the plurality of indications associated with it.

4. The web pages selection system of claim 1, wherein the at least one criterion is based on one of the plurality of repeated patterns.

5. The web pages selection system of claim 1, wherein the statistic features comprise a plurality of predicted rates of occurrence of desired user actions computed for said web pages selection rule.

6. The web pages selection system of claim 5, wherein the rule constructing unit weights said web pages selection rule according to their predicted rate of occurrence of desired user actions.

7. The web pages system of claim 5, wherein the rule constructing unit removes a new web pages selection rule which rule condition includes or covers a rule condition of another web pages selection rule, if the predicted rate of occurrence of desired user actions of said new web pages selection rule is smaller than a rule maintenance threshold.

8. The web pages selection system of claim 1, wherein the rule constructing unit validates the web pages selection rules based on a predetermined rule approval policy and removes non-valid web pages selection rules.

9. The web pages selection system of claim 1, wherein said redirection engine comprises a redirection unit which receives the at least one additional network request, identifies a plurality of characterizing features associated with it, matches said plurality of characterizing features with said matched web pages selection rule, selects a web page from a plurality of web pages based on said respective target web pages selection distribution of said matched web pages selection rule, and automatically redirects said another user terminal from which said at least one additional network request have been received to said selected web page.

10. The system of claim 9, further comprising a database hosting the plurality of web pages selection rules and a plurality of data records, each said data record comprises the plurality of characterizing features of one of the plurality of network requests and a plurality of indications associated with it, wherein the redirection unit updates said database with the plurality of characterizing features of the at least one additional network request and with its plurality of indications.

11. The system of claim 10, wherein the calculation unit routinely or periodically computes for the web pages selection rules a plurality of effectiveness evaluations reflecting the increase in desired user actions occurred since said web pages selection rules being used.

12. The system of claim 11, further comprising a module which issues alerts whenever one of the plurality of effectiveness evaluations is of negative value.

13. The system of claim 11, wherein the plurality of effectiveness evaluations comprises a plurality of predicted effectiveness evaluations reflecting the expected increase in desired user actions.

14. The system of claim 11, wherein the rule constructing unit approves web pages selection rules which effectiveness evaluation is greater than the average of their previously computed effectiveness evaluation and predicted effectiveness evaluation.

15. The system of claim 1, further comprising a network interface which receives the plurality of network requests from said plurality of user terminals over a computer network.

16. A computerized method of rule generation and adjustment for a web page selection mechanism, comprising:
   monitoring a plurality of network requests received from a plurality of browsers installed in a plurality of user terminals to access content having a plurality of landing pages;
   identifying a plurality of characterizing features in each one of said plurality of network requests;
   analyzing said plurality of network requests to identify a plurality of repeated patterns of characterizing features;
   computing, using a processor of a calculation unit, a plurality of statistic features for each one of said plurality of repeated patterns; and
   generating, by a rules constructing unit, a plurality of web pages selection rules each according to one of at least some of said plurality of repeated patterns, each one of said plurality of web pages selection rules comprises at least one criterion for matching at least one additional network request and a target web pages selection distribution set according to respective said statistic features for distributing traffic derived from said at least one additional network request among said plurality of landing pages;
   wherein a browser of a user terminal from which said at least one additional network request is received and automatically redirected to a first of said plurality of landing pages by a redirection engine which matches said at least one additional network request with a first web pages selection rule from said plurality of web pages selection rules according to respective said at least one criterion and selects said first landing page according to respective said target web pages selection distribution of said first web pages selection rule;
   wherein the plurality of landing pages comprise campaign landing web pages comprising promotional content of a campaign;
   wherein the plurality of statistic features comprise a plurality of probabilities, each said probability is a probability of a rate of occurrence of desired user actions responsive to selection of a specific web page;
   wherein the target web pages selection distribution is defined based on the plurality of probabilities.

17. The method of claim 16, further comprising recording in a database the plurality of characterizing features with plurality of indications associated with it, said plurality of indications comprise a selected web page indication specifying a web page that been selected responsive to said plurality of characterizing features, and a desired user action indication specifying occurrence of a desired user action responsive to provision of said web page, wherein a web pages selection rule is generated for each of the at least some of the plurality of repeated patterns whenever a total number of complying desired user action indications is greater than a predetermined rule creation threshold.

18. The method of claim 17, wherein the statistic features comprise a plurality of probabilities, each said probability is a probability of a rate of occurrence of desired user actions responsive to selection of a specific web page, and wherein said probabilities are computed by raising rates of desired user actions related to the repeated pattern to a power of a rule reliability factor.

19. The method of claim 18, wherein the rule reliability factor is computed for each web pages selection rule based on an average number of desired user action indications.

20. The method of claim 19, wherein the rule reliability factor is set by a piecewise linear function of the average number of desired user action indications.

21. The method of claim 18, wherein the statistic features comprise a plurality of instances of the plurality of probabilities, each said instance of plurality of probabilities is based on plurality of indications associated with network requests received within a time window selected from a plurality of time windows, wherein the target web pages selection distribution is based on a weighted average of said instances of plurality of probabilities.

22. The method of claim 21, wherein the statistic features comprise a plurality of predicted rates of occurrence of desired user actions, each said predicted rate is based on plurality of indications associated with network requests received within one of the time windows,
wherein said plurality of predicted rates are used as the weights in the weighted average.

23. The method of claim 22, wherein the plurality of time windows comprises two predetermined time windows, a first time window defined to include all network requests received, and a second time window defined to include network requests received within a predetermined recent time window.

24. The method of claim 23, wherein the predetermined recent time window is determined as a function of the number of web pages.

25. The method of claim 17, wherein the web pages selection rules are generated whenever the total number of the desired user action indications is greater than a predefined number.

26. The method of claim 25, wherein the predefined number is in the range of 200 to 300.

27. The method of claim 17, wherein a new set of web pages selection rules is generated whenever a new web page is added and number of the desired user action indications accumulated since said new web page was added is greater than a preset value.

28. The method of claim 27 wherein the preset value is in the range of 200 to 300.

29. The method of claim 27 wherein the preset value is set according to a rule creation threshold.

30. The method of claim 17, wherein the plurality of statistic features comprises at least one feature selected from a group consisting of: a number of selected web page indications associated with a specific web page, a number of desired user action indications associated with a specific web page, a total number of selected web page indications, a total number of desired user action indications, an average number of desired users actions per number of web pages, and a rate of desired user actions occurred responsive to selection of each web page.

31. The method of claim 17, wherein the predetermined rule creation threshold is in the range obtained by multiplying the number of landing pages by a predetermined parameter, said predetermined parameter an integer number between 5 and 9, inclusive, selected based on the campaign rate.

32. The method of claim 16, wherein the plurality of statistic features comprise a plurality of predicted rates of occurrence of desired user actions computed for each web pages selection rule, further comprising sorting said web pages selection rules in a descending order according to said plurality of predicted rates.

33. The method of claim 32, further comprising computing for each of the plurality of web pages selection rules a new target web pages selection distribution, and new predicted rate of occurrence of desired user actions, whenever a new web page is added.

34. The method of claim 32, wherein the interim target web pages selection distribution is computed as a weighted average of the target web pages selection distributions of the more than one web pages selection rules wherein the plurality of predicted rates of occurrence of desired user actions are used as weights.

35. The method of claim 16 further comprising:
receiving at least one additional network request;
identifying a plurality of characterizing features associated with said additional network request;
determining at least one of the plurality of web pages selection rules which rule condition matches said plurality of characterizing features;
selecting a web page based on target web pages selection distributions of said at least one of the plurality of web pages selection rules; and
directing a user terminal from which said additional network request originated to access said web page.

36. The method of claim 35, further comprising determining at least one partially matching web pages selection rule and selecting a web page based on target web pages selection distributions of said at least one partially matching web pages selection rule, if no matching web pages selection rules are determined.

37. The method of claim 36, further comprising selecting a default web pages selection rule and selecting a web page based on target web pages selection distribution of said default web pages selection rule, if no partially matching web pages selection rules are determined.

38. The method of claim 35, comprising, whenever more than one web pages selection rules are determined, computing an interim target web pages selection distribution based on target web pages selection distributions of said more than one web pages selection rules.

39. The method of claim 38, wherein the interim target web pages selection distribution defines for each of the plurality of web pages a percentage of the network requests for which said each of the plurality of web page be selected.

40. The method of claim 16, wherein the target web pages selection distribution of each of the plurality of web pages selection rules defines a percentage of the plurality of network requests for which said each of the plurality of web pages be selected.

* * * * *